United States Patent [19]  
Smykal et al.

[11] 3,796,507  
[45] Mar. 12, 1974

[54] WATER PUMP
[75] Inventors: Robert C. Smykal; Leonard D. Koryta, both of Cleveland, Ohio
[73] Assignee: Durox Equipment Company, Strongsville, Ohio
[22] Filed: June 29, 1972
[21] Appl. No.: 267,584

[52] U.S. Cl. ............... 415/111, 415/170 A, 277/39, 277/96 R
[51] Int. Cl. ............................................ F01d 11/00
[58] Field of Search .......... 415/111, 170 A; 277/38, 277/39, 96 R, 96 A

[56] References Cited
UNITED STATES PATENTS

| | | | |
|---|---|---|---|
| 2,425,209 | 8/1947 | Snyder et al. | 277/96 R |
| 3,383,116 | 5/1968 | Carter | 277/96 A |
| 2,207,183 | 7/1940 | Thrush | 415/170 A |
| 2,769,390 | 11/1956 | Heimbuch | 415/111 |
| 2,843,404 | 7/1958 | Janetz | 415/170 A |
| 2,910,313 | 10/1959 | La Bour | 415/111 |
| 3,025,069 | 3/1962 | Harker | 415/111 |
| 3,652,183 | 3/1972 | Pottharst, Jr. | 415/170 A |

FOREIGN PATENTS OR APPLICATIONS

| | | | |
|---|---|---|---|
| 208,660 | 3/1960 | Sweden | 415/111 |

*Primary Examiner*—C. J. Husar

[57] ABSTRACT

A water pump includes a pump drivingly connected with a shaft. The shaft extends through a seal construction which includes a cup-shaped bushing. The seal construction also includes a spring which biases a sealing ring into engagement with the base of the cup-shaped bushing. A stainless steel wear plate is bonded by a suitable bonding material to the base of the cup-shaped bushing and the sealing ring runs in engagement therewith.

9 Claims, 5 Drawing Figures

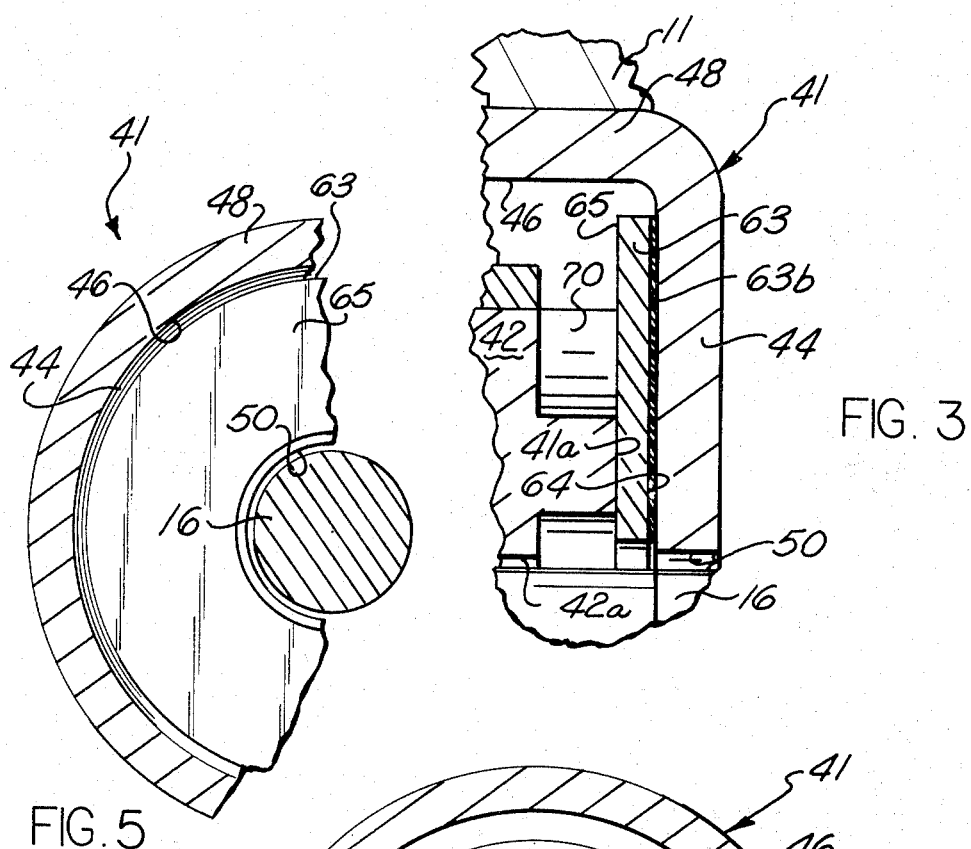
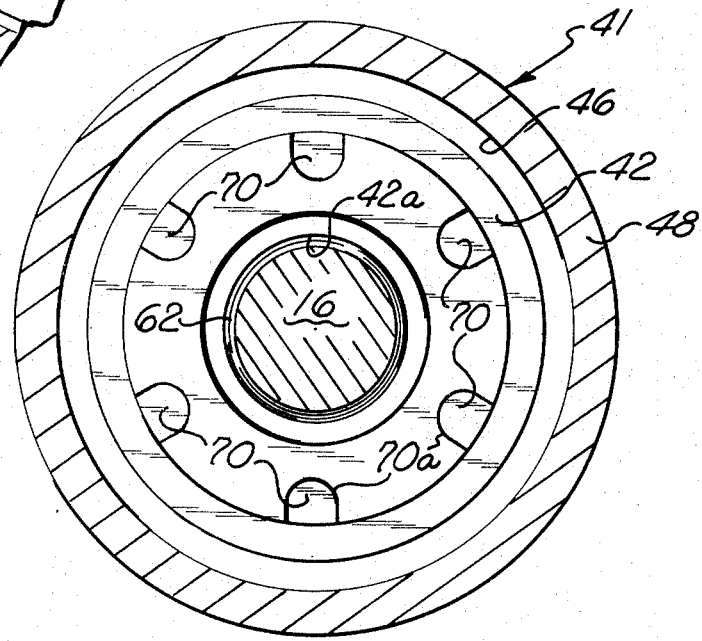
FIG. 5
FIG. 3
FIG. 4

WATER PUMP

BACKGROUND OF THE INVENTION

The present invention relates to a fluid pump.

Fluid pumps are known which include a pump impeller driven from a drive shaft. Also such pumps are known which include a cup-shaped bushing through which the water pump shaft extends. Such pumps include a seal construction for providing a seal between the base of the cup-shaped bushing and the shaft. Such seal constructions are well known and generally include a carbon ring which runs in engagement with the base of the cup-shaped bushing and a spring which biases the carbon ring into engagement with the base of the cup-shaped bushing. The bushing is secured against rotation to the housing of the pump and the carbon ring rotates with the impeller relative to the base of the cup-shaped bushing.

Such pump constructions have been subject to substantial maintenance requirements. The cup-shaped bushing is stationary and the carbon ring rotates thereon. This results in a substantial wear of the base of the cup-shaped bushing, resulting in the need for a replacement thereof or repair thereof. Pumps of this construction typically are in need of repair due to the wear created on the bushing after a period of operation in the order of six to twelve months.

SUMMARY OF THE PRESENT INVENTION

The present invention is directed to the solution of the problem of maintenance and wear of the cup-shaped bushing and provides a construction which substantially increases the life of the cup-shaped bushing minimizing replacement and wear thereof. In fact, the life of the bushing is substantially increased and is increased in the order of a period of years.

The present invention specifically is directed to a pump having a cup-shaped bushing through which the pump drive shaft extends and which drives the pump impeller. In accordance with the present invention, the base of the cup-shaped bushing is provided with a stainless steel wear plate or ring which encircles the shaft and which is bonded to the base of the cup-shaped bushing. The stainless steel plate is of an extremely high quality stainless steel and is not subject to excessive abrasion or wear due to the carbon ring running thereagainst. In addition, wiper slots are provided on the carbon ring itself which provide a degree of wiping action on the stainless steel plate in order to reduce the buildup of corrosion or other foreign matter thereon. Moreover, in accordance with the present invention, the carbon ring, an O-ring for encircling the shaft, and a retainer therefor form a replaceable unit in the pump structure.

Accordingly, it is a principal object of the present invention to provide a new and improved pump of the type which includes a cup-shaped bushing member through which the drive shaft for the pump impeller extends and wherein the base of the bushing member has a stainless steel wear plate bonded thereto and against which a carbon seal ring bears for providing a seal therebetween.

A further object of the present invention is to provide a new and improved replacement part for pumps, which replacement part comprises a bushing member of a generally cup-shape and which includes a base through which a shaft member may extend with the base of the bushing having a stainless steel wear plate bonded thereto.

A still further object of the present invention is the provision of a new and improved carbon seal ring and O-ring replaceable unit for use in a pump, and particularly one in which the carbon ring is provided with wiper grooves in the surface thereof which runs against a complementary surface.

Further objects and advantages of the present invention will be apparent to those skilled in the art to which it relates from the following detailed description of the preferred embodiment thereof made with reference to the accompanying drawings and in which:

FIG. 3 is an enlarged fragmentary view of a portion of FIG. 2;

FIG. 4 is a sectional view, taken approximately along the section line 4—4 of FIG. 1; and FIG. 5 is a sectional view, taken approximately along the section line 5—5 of FIG. 1.

Figure 1:
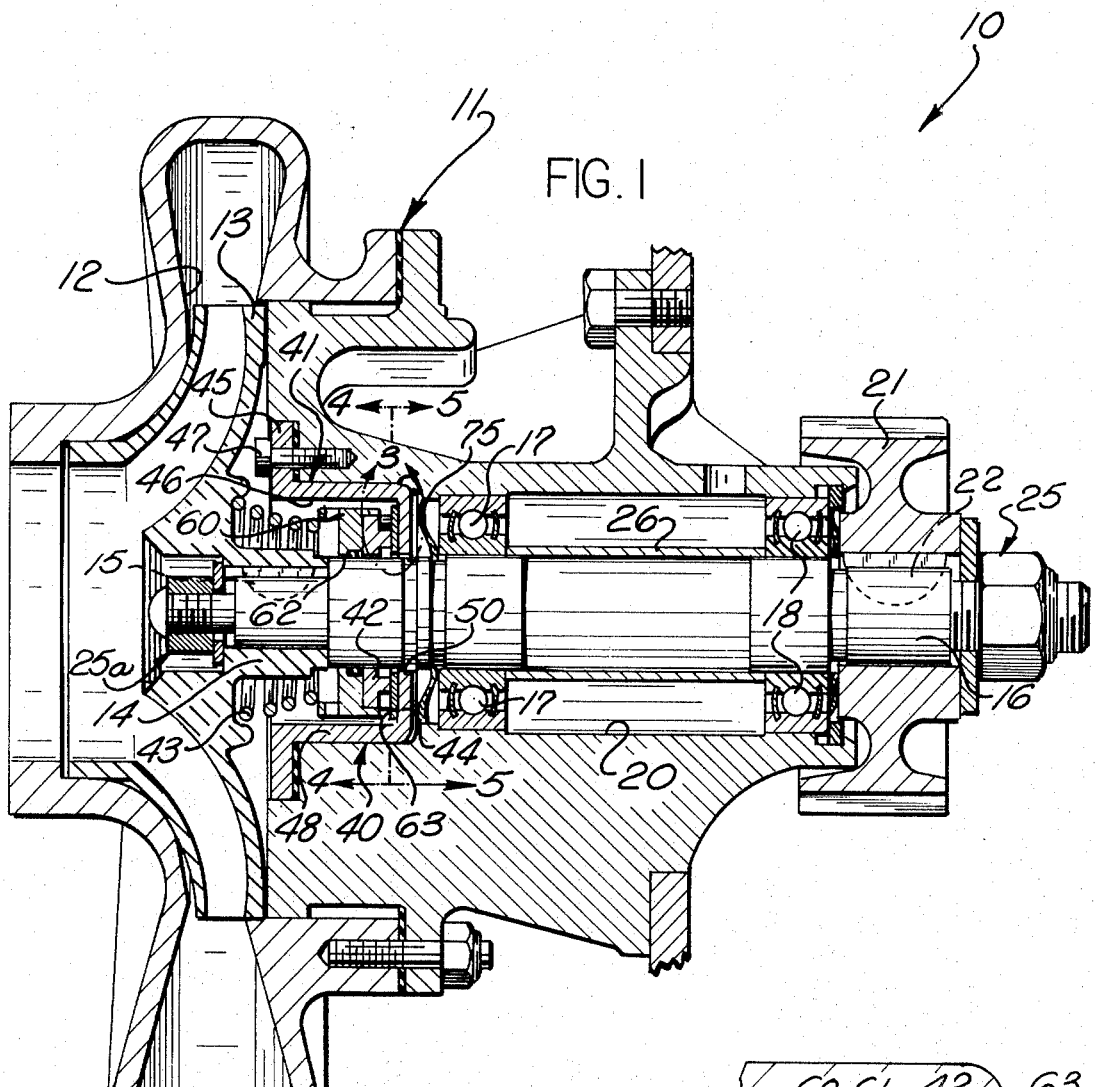
FIG. 1 is a sectional view of a pump embodying the present invention.
Figure 2:
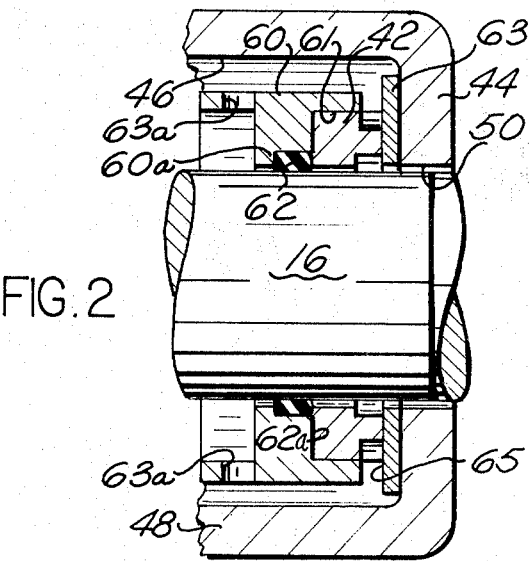
FIG. 2 is an enlarged fragmentary sectional view of a portion of the pump shown in FIG. 1.

The present invention provides a new and improved seal construction for a pump which includes a pump impeller and a drive shaft which is drivingly connected with the impeller. The drive shaft extends through the base of a cup-shaped bushing member and a carbon sealing ring rotatable with the drive shaft is biased into engagement with the base of the cup-shaped bushing and a suitable means is provided for reducing or minimizing the wear of the base of the cup-shaped bushing so as to provide a pump having a substantially improved life over pumps of similar construction known in the art.

The present invention may be applied to pumps of a variety of different constructions but is shown in the drawings as applied to a water pump 10. The pump 10 includes a pump housing 11 which defines a pumping chamber 12. A pump impeller 13 is located in the pumping chamber 12 and upon rotation of the impeller 13 fluid is drawn into the inlet of the pump and forced from the outlet thereof in a well-known and conventional manner.

The pump impeller has a hub portion 14 which is suitably drivingly connected, by a key 15, for example, to a drive shaft 16 of the pump. The drive shaft 16 is supported by bearings 17 and 18 which are suitably located in a bore or passage 20 in the pump housing 11. The shaft 16 extends outwardly of the right end of the pump housing and a gear 21 is keyed at 22 to the shaft. The gear 21 is suitably driven in order to drive the shaft 16 and thereby effect driving of the pump impeller 13.

The gear 22 is suitably secured to the outer end of the shaft and retained thereon by a suitable nut assembly 25. The pump impeller 13 is held axially on the shaft 16 by a fastening and retainer arrangement 25a. Moreover, the bearing members 17 and 18 which support the shaft in position in the housing are spaced apart and retained in that spaced relationship by a suitable spacer tube 26 which engages the inner races of the bearings 17 and 18 and encircles the shaft.

A suitable seal arrangement 40 is mounted in association with the impeller 13 and the drive shaft 16. The seal arrangement 40 includes, among other elements, a stationary bushing member 41, a sealing ring 42, and a spring member 43 which biases the sealing ring 42 into engagement with the base 44 of the bushing 41. The bushing 41 is a cup-shaped member and has an annular flange 45 which projects radially outwardly of a central bore 46 therein. The flange 45 is suitably secured by fasteners 47 to the housing 11 of the pump 10. The bushing member 41 also includes a central or main cylindrical portion 48 which extends from the flange portion 45 axially thereof and is connected with the base 44 thereof. The base 44 has an opening 50 therethrough through which the shaft 16 extends and the shaft 16 is rotatable in that opening.

The ring member 42 also has an axial opening therethrough defined by a surface 42a and through which the shaft 16 extends. The spring member 43 biases the ring 42 toward the right as viewed in the drawing, and specifically the surface 41a of the ring member 42 engages a plate 63 on the base of the bushing 41. The carbon ring surface 42a which defines an axial opening therethrough encircles the shaft 16 but is spaced slightly therefrom. These surface engagements provide a seal for blocking fluid flow therebetween and toward the bearings 17, 18.

The spring 43 is a conical-shaped spring and engages at its left end, as viewed in the drawings, the impeller member 13 and encircles the shaft 16 as well as the hub portion 14 of the impeller 13. The spring 43 bears against a retainer member 60. The retainer member 60 has a recess 61 therein, and a layer of bonding material 62a bonds the carbon ring 42 therein to form an integral unit. The carbon ring 42 and a radial projecting portion 60a of the retainer define a chamber therebetween which encircles the shaft 16. A suitable O-ring 62 is located in the chamber and sealingly engages the shaft 16 and rotates therewith. As a result of this construction, it should be apparent that the retainer 60, carbon ring 42, and seal ring 62 form a replaceable integral unit.

The retainer 60 is provided with openings 63a which co-operate with the spring or springs 43 by receiving therein a part of the spring means which bias the carbon ring 42 against the base of the bushing 41.

The spring 43, retainer 60, carbon ring 42, and the seal ring 62 all rotate with the impeller 13. Whereas, the cup-shaped bushing member 41 is a stationary member being secured to the housing 13 of the pump by fasteners 47. As a result, there is rotation of the ring 42 relative to the stationary bushing member 41. The afore-mentioned relative rotation has resulted in the past in substantial wear of the base of the bushing member 41 and has resulted in the need for replacement and repair thereof. It is important to proper smooth pump operation and to proper sealing that the surface of the bushing 41 against which the carbon ring runs is extremely flat, smooth and perpendicular to the axis of the shaft 16. To achieve such a surface, it is conventional to lap the surface of the bushing accurately.

The afore-mentioned wear has been of such an extent that this repair of the bushing member 41 by lapping has been necessitated after less than one year's use of the pump and in some cases replacement has been necessary. The present invention is also directed to the solution of this wear problem in order to minimize the need for replacement or repair of the cup-shaped bushing member 41. And, in fact, the present invention provides a substantial increase in the operative life of the pump and substantially reduces the need for repair or replacement of the bushing 41.

In accordance with the present invention, a stainless steel wear plate 63 is bonded to the base 44 of the bushing 41. The stainless steel wear plate is made of a high-grade surgical stainless steel which greatly resists abrasion and wear. While the invention is not limited to any specific steel, it has been found that 420 Surgical Steel of 50 Rockwell provides substantial results. The plate 63 is lapped properly to provide the smooth surface necessary to proper operation of the pump.

The stainless steel plate 63 is bonded to the base 44 of the cup-shaped bushing 41 by a suitable adhesive, for example, an adhesive sold by Goodyear under the name of Plastilock used for bonding brake shoe linings on the shoe support. Accordingly, there is no tendency of the stainless steel plate to rotate relative to the base 44 of the bushing 41 and, in fact, it is rigidly secured thereto. The layer of adhesive securing the plate 63 to the bushing 41 is designated 63b in FIG. 3, and is interposed between surface 64 of the plate 63 and the base 44 of the bushing 41.

The plate 63 has a lapped surface 65 forming the surface of the bushing against which the ring 42 runs. In addition, the ring surface 41a has a plurality of wiping grooves 70 therein. These grooves 70 provide wiping edges 70a which clean or scrape the surface of the plate 60 as they rotate relative thereto. In the illustrated embodiment, six such wiper grooves are provided, and they minimize surface deposits from collecting on the surface of plate 63.

It should be apparent from the above that the present invention provides a highly improved pump construction having a substantially improved life as compared to the known prior art which primarily results from the use of the high-grade stainless steel plate 63 which is bonded to the base 44 of the bushing 41 and which is not subject to excessive rapid wear due to the relative rotation between it and the seal ring 42. In addition, the wiping grooves 70 in the surface 41a of the ring 42 also improve the life of the pump. These elements along with O-ring seal 62 not only improve the life of the pump but also provide an effective fluid seal.

The pump is also provided with a conventional slinger 75 interposed between the bearing 17 and the base 44 of the bushing 41. The slinger 75, as is conventional, will throw fluid radially outwardly away from the bearing 17 in the event that any fluid comes in contact with it. This provides an additional protection for the bearings 17 and 18 to isolate them from the fluid being pumped.

From the above, it should be apparent that applicant has provided a substantially improved unique pump construction and it is intended to cover all constructions and modifications which come within the scope of the appended claims.

What is claimed is:

1. Apparatus comprising a housing defining a pumping chamber, a pump impeller located in said pumping chamber, a drive shaft drivingly connected with said pump impeller to effect rotation thereof upon rotation of said drive shaft, bearing means supporting said shaft for rotation relative to said housing, a bushing member secured to the housing and having an opening through which the shaft extends, said bushing member being interposed between said bearing means and said pump impeller, said bushing member comprising a cup-shaped bushing member having a base portion having said opening through which the shaft extends, a main body portion extending axially of said shaft from the base portion, and a flange portion extending radially from the end thereof opposite the end having the base portion, and fastening means engageable with said flange portion for securing said cup-shaped bushing to said housing, a stainless steel wear plate encircling said drive shaft, adhesive means for bonding said stainless steel wear plate to said base portion of said bushing member, and a ring seal member engageable with the stainless steel wear plate and rotatable with the shaft and relative to said bushing member and having a sealing engagement therebetween.

2. Apparatus as defined in claim 1 further including spring means biasing said ring member into engagement with said wear plate, and said ring member comprising a carbon ring member having a surface engageable with the surface of said wear plate.

3. Apparatus as defined in claim 1 wherein said carbon ring has a plurality of wiping grooves on the outer periphery thereof and which provide edges which effect a wiping of the surface of said wear plate upon relative rotation therebetween.

4. Apparatus as defined in claim 3 further including a retainer member for said ring seal member, bonding means bonding said ring seal member and retainer member together, and an O-ring seal in sealing engagement with said shaft and carried by said retainer member.

5. Apparatus for use in a pump having a housing defining a pumping chamber, an impeller in the pumping chamber and a drive shaft drivingly connected to the pump impeller, and a seal ring member forming a part of a seal between the impeller and drive shaft and rotatable therewith, said apparatus comprising a cup-shaped bushing member having a cylindrical body portion, a flange portion extending radially outwardly from one axial end of said cylindrical body portion, and a base portion extending radially inwardly from the other end of said body portion, said base portion having an opening therein for receiving the drive shaft therethrough, a stainless steel wear ring affixed to said base portion of said cup-shaped bushing, means for bonding said wear ring to said base and encircling said shaft, said cup-shaped bushing member comprising an integral metal one-piece construction and wherein said means for bonding said stainless steel wear ring to the base portion of said cup-shaped bushing comprising an adhesive bonding material interposed between the stainless steel wear ring and the base portion for the cup-shaped bushing, and said flange portion of said bushing member having openings for receiving fasteners for securing said bushing to the housing.

6. Apparatus for use in a pump having a housing defining a pumping chamber, an impeller in the pumping chamber, a drive shaft drivingly connected to the pump impeller, and a bushing member through which the shaft extends, said apparatus comprising a carbon sealing ring member for encircling the shaft and having a surface for sealingly engaging a surface of the bushing member, a retainer member for said carbon sealing ring member, means bonding said retainer member and said carbon sealing ring member together, said retainer member at least in part defining a chamber for encircling the shaft, and an O-ring seal member located in said chamber and for providing a sealing engagement with the shaft.

7. Apparatus as defined in claim 6 wherein said carbon ring has a plurality of wiping grooves on the outer periphery thereof and which provide edges which effect a wiping of the surface of said bushing member upon relative rotation therebetween.

8. Apparatus as defined in claim 6 wherein said retainer member is provided with means for receiving a spring for biasing said retainer member to urge the carbon sealing ring against the bushing.

9. Apparatus as defined in claim 6 wherein said chamber for said O-ring seal member is further defined in part by a radially projecting portion of said carbon sealing ring member whereby said O-ring seal member when located in said chamber is located between radially extending portions of said retainer member and said carbon sealing ring member.

* * * * *